United States Patent
Patten et al.

(10) Patent No.: US 11,486,752 B2
(45) Date of Patent: Nov. 1, 2022

(54) METHOD OF COMPENSATING FOR MASS FLOW USING KNOWN DENSITY

(71) Applicant: MICRO MOTION, INC., Boulder, CO (US)

(72) Inventors: Andrew Timothy Patten, Boulder, CO (US); Robert Barclay Garnett, Boulder, CO (US)

(73) Assignee: MICRO MOTION, INC., Boulder, CO (US)

( * ) Notice: Subject to any disclaimer, the term of this patent is extended or adjusted under 35 U.S.C. 154(b) by 133 days.

(21) Appl. No.: 16/979,960

(22) PCT Filed: Mar. 28, 2019

(86) PCT No.: PCT/US2019/024530
§ 371 (c)(1),
(2) Date: Sep. 11, 2020

(87) PCT Pub. No.: WO2019/195074
PCT Pub. Date: Oct. 10, 2019

(65) Prior Publication Data
US 2021/0018354 A1    Jan. 21, 2021

Related U.S. Application Data

(60) Provisional application No. 62/651,593, filed on Apr. 2, 2018.

(51) Int. Cl.
*G01F 1/84* (2006.01)
*G01F 15/02* (2006.01)

(52) U.S. Cl.
CPC ......... *G01F 15/024* (2013.01); *G01F 1/8436* (2013.01)

(58) Field of Classification Search
None
See application file for complete search history.

(56) References Cited

U.S. PATENT DOCUMENTS

| | | | |
|---|---|---|---|
| 3,979,953 A | 9/1976 | Johns et al. | |
| 5,411,374 A * | 5/1995 | Gram | F04B 19/06 417/404 |
| 5,576,500 A | 11/1996 | Cage et al. | |
| 5,687,100 A * | 11/1997 | Buttler | G01F 1/8413 702/100 |
| 6,556,931 B1 | 4/2003 | Hays et al. | |
| 6,895,825 B1 * | 5/2005 | Barkhoudarian | G01F 1/662 73/861.28 |
| 8,302,491 B2 * | 11/2012 | Stack | G01F 1/8436 73/861.357 |

(Continued)

FOREIGN PATENT DOCUMENTS

DE    102008003353 A1    7/2009

*Primary Examiner* — Harshad R Patel
(74) *Attorney, Agent, or Firm* — The Ollila Law Group LLC (57) ABSTRACT

A method for determining a mass flow measurement is provided. The method comprises calibrating a flowmeter sensor at a first temperature and flowing a fluid having a second temperature through the flowmeter sensor. A density of the fluid is input into meter electronics. A compensated mass flow value of the fluid is determined by meter electronics, wherein the Modulus of Elasticity of the flowmeter sensor is unknown.

12 Claims, 5 Drawing Sheets

(56) References Cited

U.S. PATENT DOCUMENTS

| | | | |
|---|---|---|---|
| 2008/0034893 A1* | 2/2008 | Stappert | G01F 1/849 |
| | | | 73/861.354 |
| 2012/0055229 A1 | 3/2012 | Pankratz et al. | |
| 2018/0031404 A1 | 2/2018 | Shen et al. | |

* cited by examiner

METHOD OF COMPENSATING FOR MASS FLOW USING KNOWN DENSITY

TECHNICAL FIELD

The embodiments described below relate to compensation methods and, more particularly, to a method of compensating the mass flow measurement of a Coriolis sensor, for temperature, using a known fluid density and the drive frequency.

BACKGROUND

Coriolis meters are designed to provide accurate measurements of both mass flow rate and density of fluids flowing through a pipeline under a wide range of process fluid and environmental conditions. There are many applications where Coriolis meters are used as a reference for the calibration of other flow measurement devices. Naturally, this requires a high degree of accuracy.

One such application is for rocket engine testing, for example. In this application, there is a need to calibrate Venturi flow meters used to measure the flow of liquid Hydrogen and Oxygen into rocket test stands. Accuracy requirements for a reference sensor, at process conditions, for such an application are high, with a need of 0.35% in some applications.

Currently, sensors in cryogenic applications, including LNG, liquid Argon, Nitrogen and Oxygen, have shown mass measurement accuracy, using traditional temperature correction, to be 1% at best.

It is understood that the relationship between mass flow rate and the flow measurement signal of a Coriolis sensor is highly dependent upon the stiffness of the vibrating tube or tubes. It is also understood temperature can affect the stiffness of the tube or tubes of a Coriolis flow sensor by three different mechanisms.

The first mechanism is the change in the Modulus of Elasticity with temperature. This effect was recognized many years ago and a linear temperature compensation was developed, as given in Equation 1:

$$\dot{m} = FCF \cdot (\Delta t - \text{zero}) \cdot (1 - \phi \cdot \Delta T) \quad (1)$$

where:
  $\dot{m}$=mass flow
  FCF=Flow Calibration Factor (units: g/s per µs)
  $\Delta t$=fundamental Coriolis time measurement
  zero=$\Delta t$ at no-flow conditions
  $\phi$=temperature coefficient for changing Modulus of Elasticity
  $\Delta T$=temperature difference (° C.).

Figure 2:
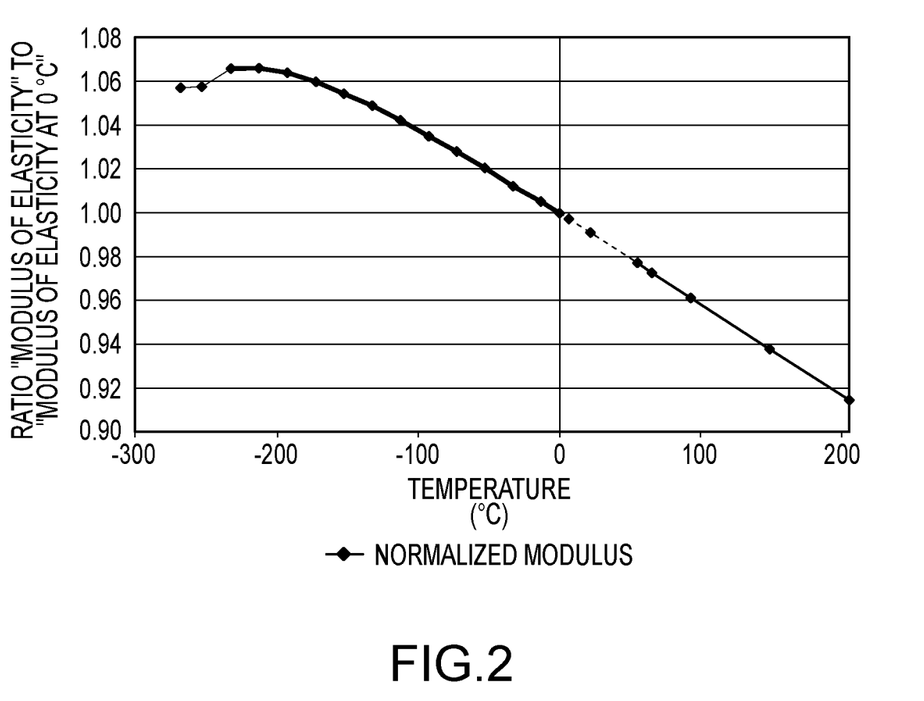
FIG. 2 shows a graph detailing modulus change of 316 Stainless Steel over temperature.
Figure 3:
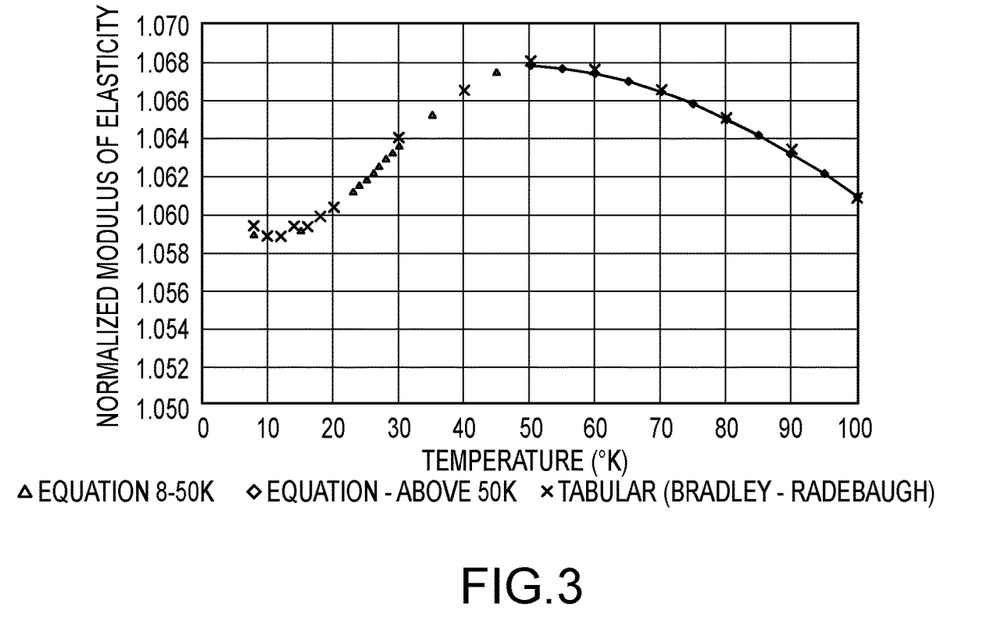
FIG. 3 shows a graph detailing 316 Stainless Steel modulus of elasticity at cryogenic temperatures.
Figure 4:
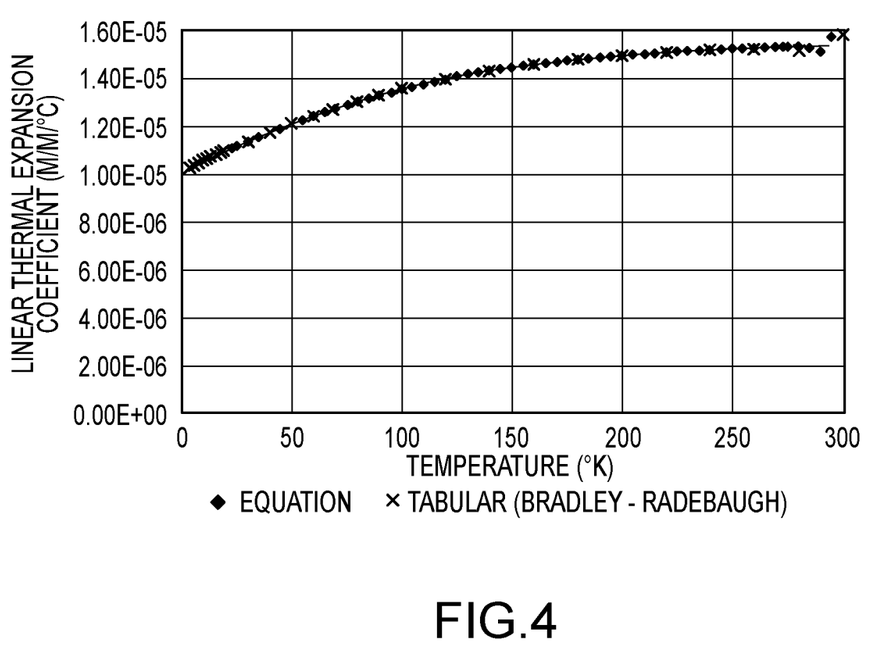
FIG. 4 shows a graph detailing 316 Stainless Steel thermal expansion at cryogenic temperatures.

Over the range of applications for most Coriolis sensors, the change in the Modulus of Elasticity with temperature is near linear, so this correction works well in most applications. When Coriolis sensors were first applied to Cryogenic applications, it was recognized that the modulus was non-linear below 0° C.; as shown in FIG. 2. A correction was developed for low temperature and Cryogenic applications, down to −233° C., as given in Equation 2:

$$\dot{m} = FCF \cdot (\Delta t - \text{zero}) \cdot (\phi + \phi_1 \cdot \Delta T + \phi_2 \cdot \Delta T^2 + \phi_3 \cdot \Delta T^3) \quad (2)$$

where each $\phi$ term is a polynomial coefficient that characterizes the non-linear modulus behavior, especially at low temperatures. This is illustrated in FIG. 3. It should be noted that Equation 2 collapses to Equation 1 when $\phi_2$ and $\phi_3$ each have a value of 0.

The second mechanism influencing tube stiffness is the dilatation of the material with changes in temperature. If the tube is unconstrained, its length, cross section and the internal volume all change, effectively changing the stiffness.

It was empirically observed that the temperature correction on tube period squared, used in density measurement, was not the same as that for Flow Calibration Factor, FCF. It was determined that this was due to thermal expansion. General forms of the mass flow and density equations were developed, idealizing a U-tube Coriolis sensor as a cantilevered beam. The relationships for flow and density measurement, accounting for this mechanism are given in Equations 3 and 4; respectively.

$$\dot{m} = FCF \cdot (\Delta t - \text{zero}) \cdot (1 - f(\phi) \cdot \Delta T) \cdot (1 + \alpha \cdot \Delta T) \quad (3)$$

where:
  $\alpha$=thermal expansion coefficient
  $f(\phi)$=the polynomial expressed in Equation 2.

$$\rho_f = \frac{K^2 \cdot C_1 \cdot (1 - f(\phi) \cdot \Delta T)}{(1 + \alpha \cdot \Delta T)^2} - \frac{C_2}{(1 + \alpha \cdot \Delta T)^3} \quad (4)$$

where:
  $K^2$=Period squared
  C1 & C2=calibration constants
  $f(\phi)$=the polynomial expressed in equation 2.

The third mechanism affecting tube stiffness is thermally induced stress. If the tube or tubes are not free to move with changing temperature the thermal strain will be counteracted by a mechanically restoring strain. This effect is significant with straight tube or low-profile Coriolis sensors. For other sensor geometries this mechanism is essentially negligible.

SUMMARY

A method for determining a mass flow measurement is provided according to an embodiment. A flowmeter sensor is calibrated at a first temperature. A fluid having a second temperature that is different from the first temperature is flowed through the flowmeter sensor. A density of the fluid is input into a flowmeter electronics. A compensated mass flow value of the fluid is determined with the meter electronics, wherein the Modulus of Elasticity of the flowmeter sensor is unknown.

A flowmeter comprising meter electronics configured to receive a process fluid having a second temperature, the meter electronics configured to communicate with a sensor assembly of the flowmeter is provided. At least one flow conduit is configured to receive the process fluid. At least one driver is configured to vibrate the at least one flow conduit. At least one pickoff for detecting vibrations of the at least one flow conduit is provided, wherein the flowmeter is calibrated at a first temperature. A density of the fluid is input into meter electronics, and the meter electronics is configured to determine a compensated mass flow value of the fluid wherein the Modulus of Elasticity of the at least one flow conduit is unknown.

Aspects

According to an aspect a method for determining a mass flow measurement comprises a flowmeter sensor is calibrated at a first temperature. A fluid having a second temperature that is different from the first temperature is flowed through the flowmeter sensor. A density of the fluid is input into a flowmeter electronics. A compensated mass flow value of the fluid is determined with the meter electronics, wherein the Modulus of Elasticity of the flowmeter sensor is unknown.

Preferably, the density is a known reference value.

Preferably, the density is calculated from an equation of state.

Preferably, the equation of state comprises a pressure term and a temperature term.

Preferably, the compensated mass flow rate is calculated as:

$$\dot{m} = FCF \cdot (\Delta t - \text{zero}) \cdot \frac{\rho_f \cdot (1 + \alpha \cdot \Delta T)^3 + C_2}{K^2 \cdot C_1}$$

Preferably, the accuracy of the compensated mass flow value is ±0.5%.

Preferably, the first temperature is a non-cryogenic temperature, and the second temperature is a cryogenic temperature.

According to an aspect, a flowmeter comprising meter electronics configured to receive a process fluid having a second temperature, wherein the meter electronics configured to communicate with a sensor assembly of the flowmeter. At least one flow conduit is configured to receive the process fluid. At least one driver is configured to vibrate the at least one flow conduit. At least one pickoff for detecting vibrations of the at least one flow conduit is provided, wherein the flowmeter is calibrated at a first temperature. A density of the fluid is input into meter electronics, and the meter electronics is configured to determine a compensated mass flow value of the fluid wherein the Modulus of Elasticity of the at least one flow conduit is unknown.

Preferably, the density is a known reference value.

Preferably, the density is calculated from an equation of state.

Preferably, the equation of state comprises a pressure term and a temperature term.

Preferably, the compensated mass flow rate is calculated as:

$$\dot{m} = FCF \cdot (\Delta t - \text{zero}) \cdot \frac{\rho_f \cdot (1 + \alpha \cdot \Delta T)^3 + C_2}{K^2 \cdot C_1}$$

Preferably, the accuracy of the compensated mass flow value is ±0.5%.

Preferably, the first temperature is a non-cryogenic temperature, and the second temperature is a cryogenic temperature.

BRIEF DESCRIPTION OF THE DRAWINGS

The same reference number represents the same element on all drawings. It should be understood that the drawings are not necessarily to scale.

DETAILED DESCRIPTION

FIGS. 1-5 and the following description depict specific examples to teach those skilled in the art how to make and use the best mode of the embodiments. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the compensation method. As a result, the embodiments described below are not limited to the specific examples described below. Furthermore, the figures may describe a particular metal, alloy, and/or fluid for example purposes. The embodiments provided are not limited to the particular metal, alloy, and/or fluid disclosed, as different metals, alloys, and/or fluids are contemplated.

Figure 1:
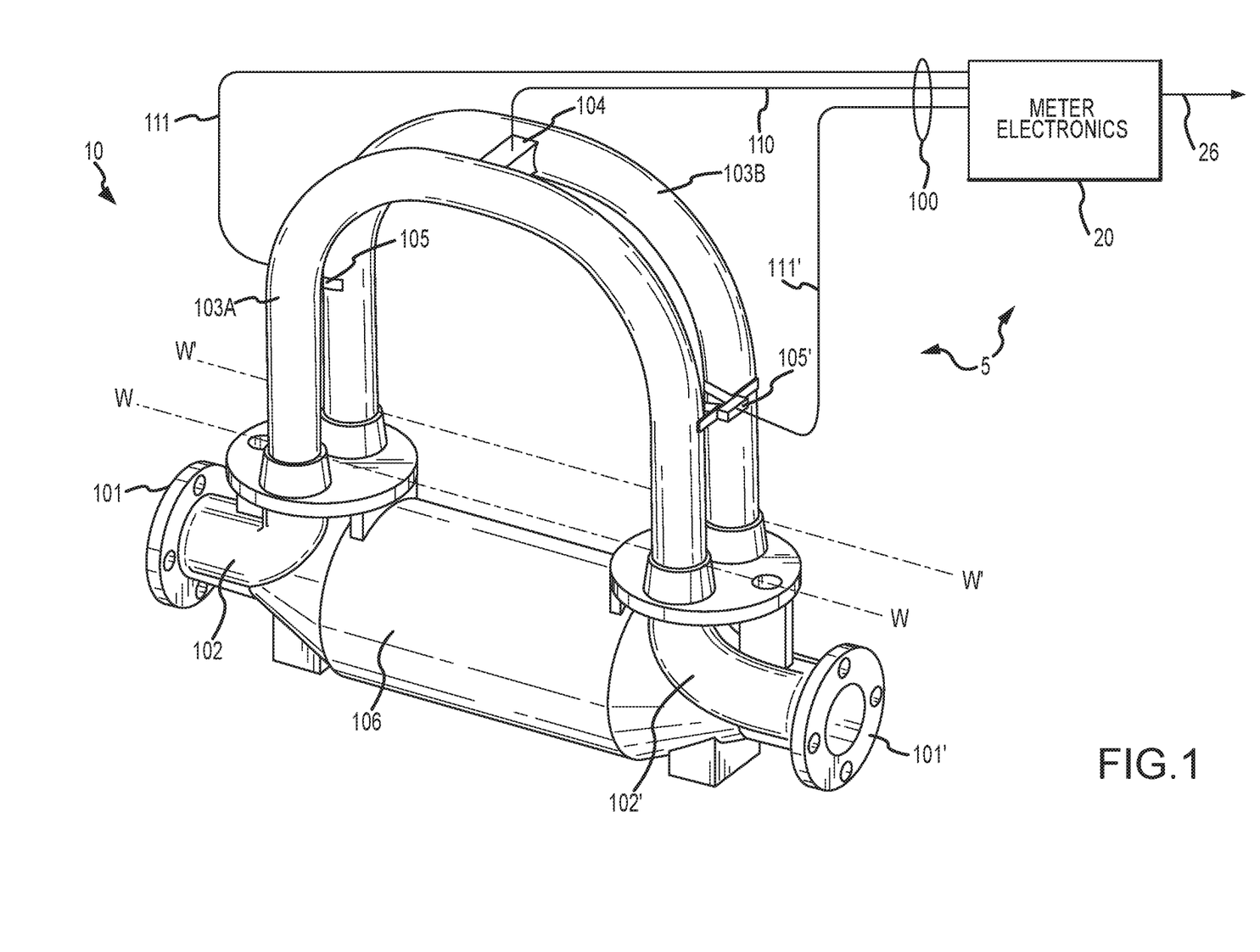
FIG. 1 shows a flowmeter comprising a sensor assembly and meter electronics.

FIG. 1 shows a flowmeter 5 according to an embodiment. The flowmeter 5 comprises a sensor assembly 10 and meter electronics 20. The meter electronics 20 is connected to the sensor assembly 10 via leads 100 and is configured to provide measurements of one or more of a density, mass flow rate, volume flow rate, totalized mass flow, temperature, or other measurements or information over a communication path 26. The flowmeter 5 can comprise a Coriolis mass flowmeter or other vibratory flowmeter. It should be apparent to those skilled in the art that the flowmeter 5 can comprise any manner of flowmeter 5, regardless of the number of drivers, pick-off sensors, flow conduits, or the operating mode of vibration.

The sensor assembly 10 includes a pair of flanges 101 and 101', manifolds 102 and 102', a driver 104, pick-off sensors 105 and 105', and flow conduits 103A and 103B. The driver 104 and the pick-off sensors 105 and 105' are connected to the flow conduits 103A and 103B.

The flanges 101 and 101' are affixed to the manifolds 102 and 102'. The manifolds 102 and 102' can be affixed to opposite ends of a spacer 106 in some embodiments. The spacer 106 maintains the spacing between the manifolds 102 and 102'. When the sensor assembly 10 is inserted into a pipeline (not shown) which carries the process fluid being measured, the process fluid enters the sensor assembly 10 through the flange 101, passes through the inlet manifold 102 where the total amount of process fluid is directed to enter the flow conduits 103A and 103B, flows through the flow conduits 103A and 103B and back into the outlet manifold 102', where it exits the sensor assembly 10 through the flange 101'.

The process fluid can comprise a liquid. The process fluid can comprise a gas. The process fluid can comprise a multi-phase fluid, such as a liquid including entrained gases and/or entrained solids, for example without limitation. The flow conduits 103A and 103B are selected and appropriately mounted to the inlet manifold 102 and to the outlet manifold 102' so as to have substantially the same mass distribution, moments of inertia, and elastic moduli about the bending axes W-W and W'-W', respectively. The flow conduits 103A and 103B extend outwardly from the manifolds 102 and 102' in an essentially parallel fashion.

The flow conduits 103A and 103B are driven by the driver 104 in opposite directions about the respective bending axes W and W' and at what is termed the first out of phase bending mode of the flowmeter 5. The driver 104 may comprise one of many well-known arrangements, such as a magnet mounted to the flow conduit 103A and an opposing coil mounted to the flow conduit 103B. An alternating current is passed through the opposing coil to cause both conduits to oscillate. A suitable drive signal is applied by the meter electronics 20 to the driver 104 via lead 110. Other driver devices are contemplated and are within the scope of the description and claims.

The meter electronics 20 receives sensor signals on leads 111 and 111', respectively. The meter electronics 20 produces a drive signal on lead 110 which causes the driver 104 to oscillate the flow conduits 103A and 103B. Other sensor devices are contemplated and are within the scope of the description and claims.

The meter electronics 20 processes the left and right velocity signals from the pick-off sensors 105 and 105' in order to compute a flow rate, among other things. The communication path 26 provides an input and an output means that allows the meter electronics 20 to interface with an operator or with other electronic systems. The description of FIG. 1 is provided merely as an example of the operation of a flowmeter and is not intended to limit the teaching of the present invention. In embodiments, single tube and multi-tube flowmeters having one or more drivers and pickoffs are contemplated.

The meter electronics 20 in one embodiment is configured to vibrate the flow conduit 103A and 103B. The vibration is performed by the driver 104. The meter electronics 20 further receives resulting vibrational signals from the pickoff sensors 105 and 105'. The vibrational signals comprise a vibrational response of the flow conduits 103A and 103B. The meter electronics 20 processes the vibrational response and determines a response frequency and/or phase difference. The meter electronics 20 processes the vibrational response and determines one or more flow measurements, including a mass flow rate and/or density of the process fluid. Other vibrational response characteristics and/or flow measurements are contemplated and are within the scope of the description and claims.

In one embodiment, the flow conduits 103A and 103B comprise substantially omega-shaped flow conduits, as shown. Alternatively, in other embodiments, the flowmeter can comprise substantially straight flow conduits, U-shaped conduits, delta-shaped conduits, etc. Additional flowmeter shapes and/or configurations can be used and are within the scope of the description and claims.

From FIG. 3, it can be seen that the Modulus of Elasticity of 316 Stainless Steel is not linear at the temperatures of liquid Hydrogen, 20° K at standard pressure. It can also be seen that if the change in Modulus were the only effect on Δt, then the difference at any flow rate, from that made at 0° C. (273.15° K), would vary between 6 and 6.8% over the range from 20 to 50° K. This also assumes the material properties of the actual sensor would behave similar to the available data for this alloy.

A method of determining the change in modulus with temperature using a known or assumed density at a temperature near the application is provided according to an embodiment. This embodiment also makes the assumption that the coefficient of thermal expansion is constant. From FIG. 4, it can be seen that assumption would introduce slightly more error. Again, it must be noted that 316 Stainless Steel is provided for example purposes only, and similar trends exist in different metals/alloys.

In an embodiment, the total uncertainty of a cryogenic mass flow measurement is minimized by eliminating the Modulus of Elasticity correction and the related problems of calibrating flow at cryogenic temperatures. Using equations of state for fluid density, which are well known for single component fluids, such as liquid Hydrogen or Natural Gas for example, an accurate mass flow calculation can be achieved without the issues indicated above.

Unlike prior compensation methods, this method eliminates the dependency of the mass flow equation on the change in Modulus of Elasticity as a function of temperature. In an embodiment, an equation for Mass Flow Rate measurement, independent of the change in modulus with temperature, is provided; as given in Equation 5.

$$\dot{m} = FCF \cdot (\Delta t - \text{zero}) \cdot \frac{\rho_f \cdot (1 + \alpha \cdot \Delta T)^3 + C_2}{K^2 \cdot C_1} \quad (5)$$

The fluid density $\rho_f$ could either be input as a known quantity or, in the case of a known fluid like commercially pure Hydrogen, calculated from an equation of state using pressure and temperature inputs. Temperature and pressure may simply be input into a meter or may be measured by at least one of a temperature and pressure sensor. For a dual-tube U-tube Coriolis sensor operating in this manner, it is reasonable to expect a flow accuracy of ±0.5% while measuring a pure cryogenic fluid like liquid Hydrogen.

Figure 5:
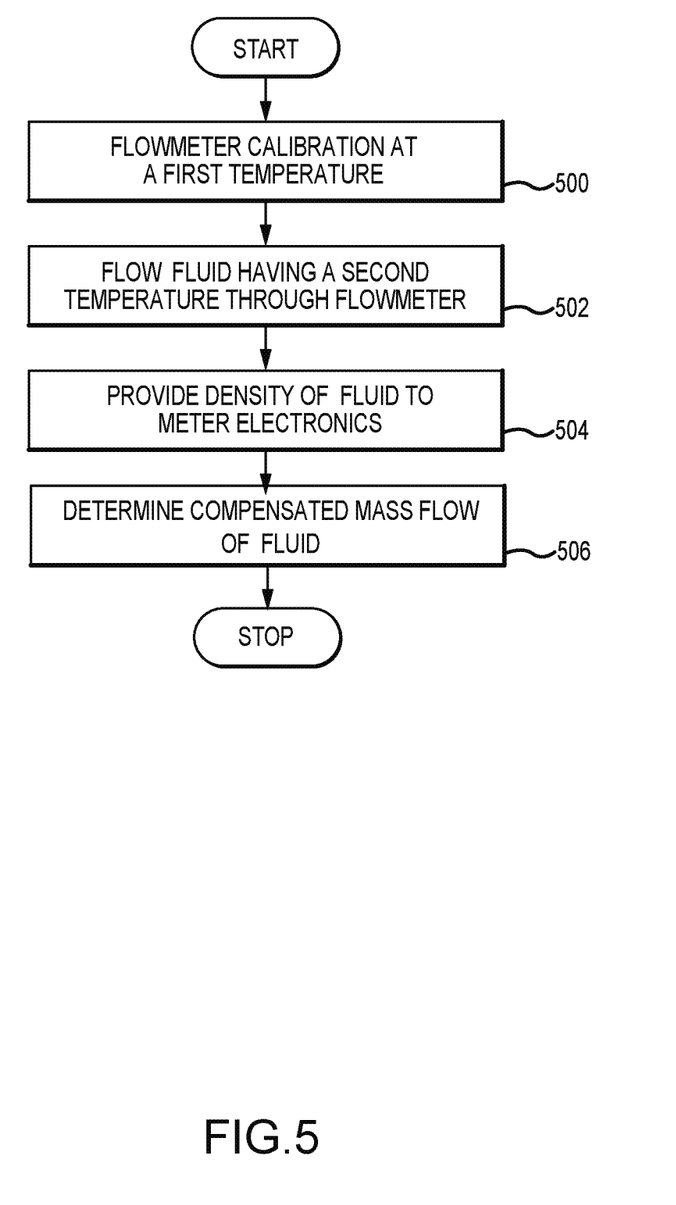
FIG. 5 illustrates a method of determining mass flow according to an embodiment.

Turning to FIG. 5, a flow chart is provided outlining the steps of an embodiment of determining a mass flow measurement. In step 500, a flowmeter is calibrated at a first temperature. Despite being calibrated specifically at a first temperature, in step 502, a fluid having a second, different, temperature is flowed through the flowmeter sensor 10. In step 504, the density of the fluid is provided to the flowmeter electronics 20. In step 506, a compensated mass flow value of the fluid is determined with the meter electronics 20. In this case, the Modulus of Elasticity of the flowmeter sensor remains unknown and unutilized by meter electronics, which is a severe departure from the prior art. This is illustrated by Equation 5. It will thus be clear to those skilled in the art that temperature measurements are also not critical for accurate flow rate measurement. In fact, the flow error contribution of temperature may be as low as 0.0006%, and thus be negligible compared to factors such as fluid density, pressure, calibrations constants, and other uncertainty-related factors.

In an embodiment, the first temperature (i.e. the temperature at which the flowmeter is calibrated) is non-cryogenic. This would typically correspond to a range of temperatures typical of a manufacturing facility—i.e. around "room temperature." However, the flow fluid is cryogenic, so the temperature is between about −100° C. and −273° C. One benefit of this is a reduction in cost and difficulty of cryogenic fluid handling during calibration. For the reasons noted above, the flowmeter calibrated at standard room temperatures will still be accurate with cryogenic fluids— again a departure from the prior art. This is illustrated by Table 1, which is provided as an example only, and are no way limiting. The values therein are illustrative only for a one particular flowmeter model, and do not serve to limit embodiments.

Uncertainty Calculations:
Variables influencing Mass Flow Measurement.

$$\dot{m} = f(FCF, zero, C_2, \Delta t, K, \Delta T, \alpha, \rho, other) \quad (6)$$

Uncertainty of Mass Flow Measurement due to any single variable, x.

$$\frac{\partial \dot{m}}{\partial x} \cdot dx \quad (7)$$

Total uncertainty of Mass Flow Measurement due to all variables.

$$d\dot{m} = \sqrt{\sum_x \left(\frac{\partial \dot{m}}{\partial x} \cdot dx\right)^2} \quad (8)$$

Estimated Mass Flow Measurement Error.

$$\frac{d\dot{m}}{\dot{m}} = \frac{1}{\dot{m}} \cdot \sqrt{\sum_x \left(\frac{\partial \dot{m}}{\partial x} \cdot dx\right)^2} \quad (9)$$

Uncertainty and Portion of Flow Error due to uncertainty of the change in temperature from calibration, $\Delta T$.

$$\frac{\partial \dot{m}}{\partial (\Delta T)} \cdot d(\Delta T) = \frac{3 \cdot \alpha \cdot FCF \cdot \Delta t \cdot \rho_f \cdot (1 + \alpha \cdot \Delta T)^2}{K^2 \cdot C_1} \cdot d(\Delta T) \quad (10)$$

$$\frac{1}{\dot{m}} \cdot \frac{\partial \dot{m}}{\partial (\Delta T)} \cdot d(\Delta T) = \frac{3 \cdot \alpha \cdot \rho_f \cdot (1 + \alpha \cdot \Delta T)^2}{\rho_f \cdot (1 + \alpha \cdot \Delta T)^3 + C_2} \cdot d(\Delta T)$$

Uncertainty and Portion of Flow Error due to uncertainty in coefficient of thermal expansion, $\alpha$.

$$\frac{\partial \dot{m}}{\partial (\alpha)} \cdot d(\alpha) = \frac{3 \cdot \Delta T \cdot FCF \cdot \Delta t \cdot \rho_f \cdot (1 + \alpha \cdot \Delta T)^2}{K^2 \cdot C_1} \cdot d(\alpha) \quad (11)$$

$$\frac{1}{\dot{m}} \cdot \frac{\partial \dot{m}}{\partial (\alpha)} \cdot d(\alpha) = \frac{3 \cdot \Delta T \cdot \rho_f \cdot (1 + \alpha \cdot \Delta T)^2}{\rho_f \cdot (1 + \alpha \cdot \Delta T)^3 + C_2} \cdot d(\alpha)$$

Uncertainty and Portion of Flow Error due to uncertainty in fluid density, $\rho_f$.

$$\frac{\partial \dot{m}}{\partial (\rho_f)} \cdot d(\rho_f) = \frac{FCF \cdot \Delta t \cdot (1 + \alpha \cdot \Delta T)^3}{K^2 \cdot C_1} \cdot d(\rho_f) \quad (11)$$

$$\frac{1}{\dot{m}} \cdot \frac{\partial \dot{m}}{\partial (\rho_f)} \cdot d(\rho_f) = \frac{(1 + \alpha \cdot \Delta T)^3}{\rho_f \cdot (1 + \alpha \cdot \Delta T)^3 + C_2} \cdot d(\rho_f)$$

Uncertainty and Portion of Flow Error due to uncertainty in tube period, K.

$$\frac{\partial \dot{m}}{\partial (K)} \cdot d(K) = -2 \cdot FCF \cdot \Delta t \cdot \frac{\rho_f \cdot (1 + \alpha \cdot \Delta T)^3 + C_2}{K^3 \cdot C_1} \cdot d(K) \quad (13)$$

$$\frac{1}{\dot{m}} \cdot \frac{\partial \dot{m}}{\partial (K)} \cdot d(K) = \frac{-2}{K} \cdot d(K)$$

The total estimated flow error uncertainty for a Coriolis flow meter, with a C2 of 1943 kg/m3, is given in Table 1.

TABLE 1

| Mass Flow Variable | Nominal Value, x | Deviation, dx | Flow Error Contribution |
| --- | --- | --- | --- |
| $\Delta t$, zero and other calibration constants | — | — | 0.10% |
| Pressure and other flow effects | — | — | 0.10% |
| Temperature measurement, ° C. | −253 | 5 | 0.0006% |
| CTE Estimate, ° C.$^{-1}$ | $11.1 \times 10^{-6}$ | $5.0 \times 10^{-6}$ | 0.01% |
| Fluid Density, kg/m$^3$ | 71.2 | 4 | 0.20% |
| Tube Period, μsec | 10,691 | 1 | 0.02% |
| Total Flow Measurement Uncertainty | | | ±0.24% |

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other fuel consumption calculations of a fuel and water mixture and not just to the embodiments described above and shown in the accompanying figures.

What is claimed is:

1. A method for determining a mass flow measurement, comprising:
   calibrating a flowmeter sensor at a first temperature;
   flowing a fluid having a second temperature that is different from the first temperature through the flowmeter sensor;
   inputting a density of the fluid into a flowmeter electronics;
   determining a compensated mass flow value of the fluid with the meter electronics, without using a function that utilizes a temperature or Modulus of Elasticity;
   wherein the compensated mass flow rate is calculated as:

$$\dot{m} = FCF \cdot (\Delta t - \text{zero}) \cdot \frac{\rho_f \cdot (1 + \alpha \cdot \Delta T)^3 + C_2}{K^2 \cdot C_1}$$

where:
   $\dot{m}$=mass flow
   FCF=Flow Calibration Factor (units: g/s per μs)
   $\Delta t$=fundamental Coriolis time measurement
   zero=$\Delta t$ at no-flow conditions
   $\rho_f$=fluid density
   $\alpha$=thermal expansion coefficient
   C1 & C2=calibration constants
   $K^2$=Period squared.

2. The method of claim 1, wherein the density is a known reference value.

3. The method of claim 1, wherein the density is calculated from an equation of state.

4. The method of claim 3, wherein the equation of state comprises a pressure term and a temperature term.

5. The method of claim 1, wherein the accuracy of the compensated mass flow value is ±0.5%.

6. The method of claim 1, wherein the first temperature is a non-cryogenic temperature, and the second temperature is a cryogenic temperature.

7. A flowmeter (5) comprising meter electronics (20) configured to receive a process fluid having a second temperature, the meter electronics (20) configured to communicate with a sensor assembly (10) of the flowmeter (5), wherein the flowmeter (5) comprises:
   at least one flow conduit (103A, 103B) configured to receive the process fluid;
   at least one driver (104) configured to vibrate the at least one flow conduit (103A, 103B);
   and at least one pickoff (105, 105') for detecting vibrations of the at least one flow conduit (103A, 103B);
   wherein the flowmeter is calibrated at a first temperature;
   wherein a density of the fluid is input into meter electronics (20); and
   wherein the meter electronics (20) is configured to determine a compensated mass flow value of the fluid without using a function that utilizes a temperature or Modulus of Elasticity of the at least one flow conduit (103A, 103B) as variables;
   wherein the compensated mass flow rate is calculated as:

$$\dot{m} = FCF \cdot (\Delta t - \text{zero}) \cdot \frac{\rho_f \cdot (1 + \alpha \cdot \Delta T)^3 + C_2}{K^2 \cdot C_1}$$

where:
   $\dot{m}$=mass flow
   FCF=Flow Calibration Factor (units: g/s per μs)
   $\Delta t$=fundamental Coriolis time measurement
   zero=$\Delta t$ at no-flow conditions
   $\rho_f$=fluid density
   $\alpha$=thermal expansion coefficient
   C1 & C2=calibration constants
   $K^2$=Period squared.

8. The flowmeter (5) of claim 7, wherein the density is a known reference value.

9. The flowmeter (5) of claim 7, wherein the density is calculated from an equation of state.

10. The flowmeter (5) of claim 9, wherein the equation of state comprises a pressure term and a temperature term.

11. The flowmeter (5) of claim 7, wherein the accuracy of the compensated mass flow value is ±0.5%.

12. The flowmeter (5) of claim 7, wherein the first temperature is a non-cryogenic temperature, and the second temperature is a cryogenic temperature.

* * * * *

UNITED STATES PATENT AND TRADEMARK OFFICE
CERTIFICATE OF CORRECTION

PATENT NO. : 11,486,752 B2
APPLICATION NO. : 16/979960
DATED : November 1, 2022
INVENTOR(S) : Andrew Timothy Patten et al.

It is certified that error appears in the above-identified patent and that said Letters Patent is hereby corrected as shown below:

In the Specification

Column 8, Line 5, the equation should appear as follows:

$$\frac{\partial \dot{m}}{\partial(\rho_f)} \cdot d(\rho_f) = \frac{FCF \cdot \Delta t \cdot (1 + \alpha \cdot \Delta T)^3}{K^2 \cdot C_1} \cdot d(\rho_f) \qquad (12)$$

$$\frac{1}{\dot{m}} \cdot \frac{\partial \dot{m}}{\partial(\rho_f)} \cdot d(\rho_f) = \frac{(1 + \alpha \cdot \Delta T)^3}{\rho_f \cdot (1 + \alpha \cdot \Delta T)^3 + C_2} \cdot d(\rho_f)$$

Signed and Sealed this
Fifteenth Day of October, 2024

Katherine Kelly Vidal
*Director of the United States Patent and Trademark Office*